UNITED STATES PATENT OFFICE.

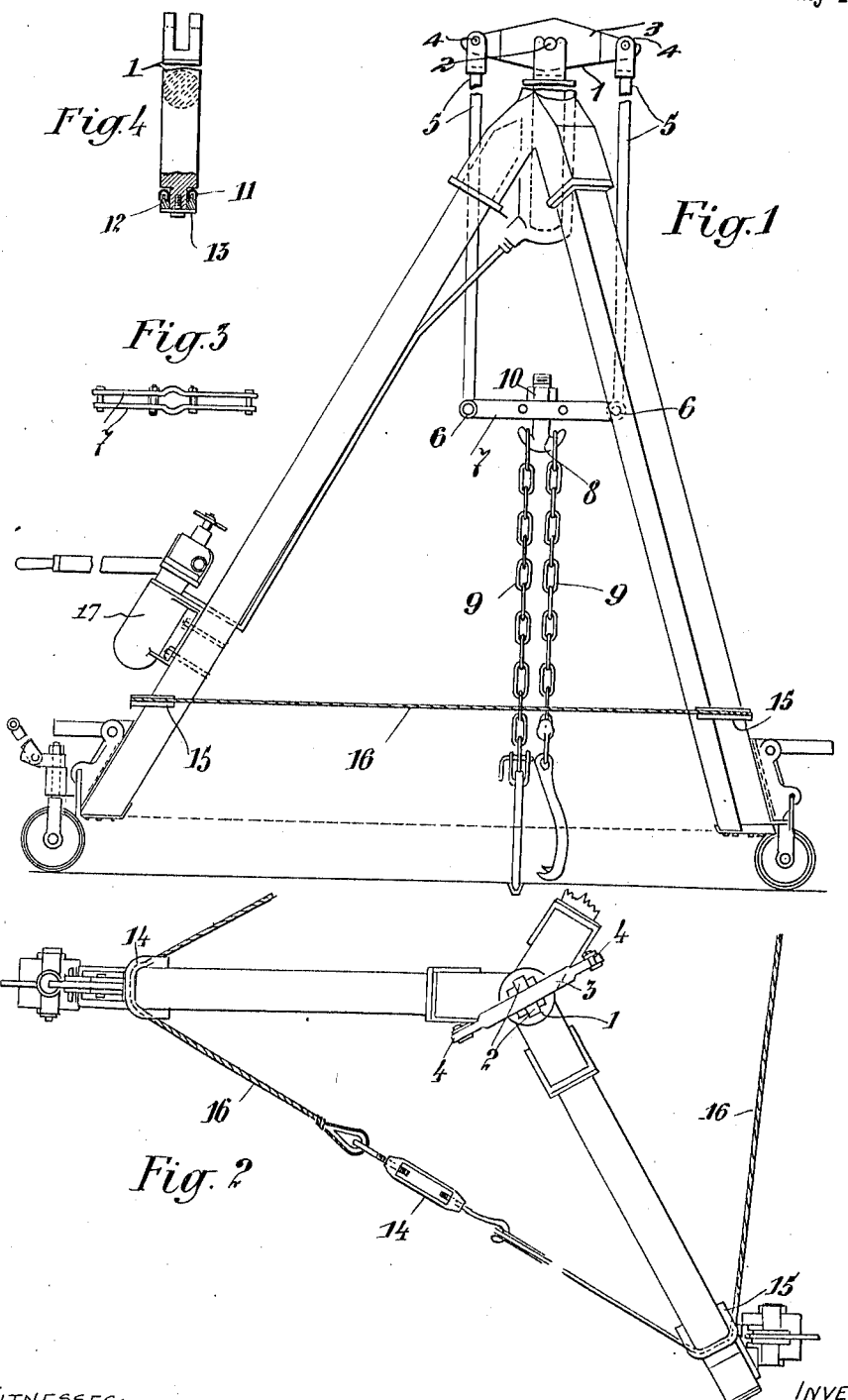

KAROL von der MALSBURG, OF DUBLANY, NEAR LEMBERG, AUSTRIA-HUNGARY.

APPARATUS FOR PULLING TREE-STUMPS OUT OF THE GROUND.

1,096,874.      Specification of Letters Patent.     Patented May 19, 1914.

Application filed October 15, 1912. Serial No. 725,775.

*To all whom it may concern:*

Be it known that I, KAROL VON DER MALSBURG, a subject of the Austro-Hungarian Emperor, residing in Dublany, near Lemberg, in the Province of Galicia, in the Austro-Hungarian Empire, have invented certain new and useful Improvements in Apparatus for Pulling Tree-Stumps Out of the Ground, of which the following is a specification.

This invention relates to apparatus for pulling tree stumps out of the ground of the type comprising a portable framing provided at its upper part with a hydraulic cylinder in which works a plunger to the upper end of which are connected chains provided with hooks adapted to be engaged with the tree stump.

A force pump is mounted on the framing so that when the apparatus has been moved over the tree stump, a great pulling force can be exerted upon the latter so as to pull it vertically out of the ground. The upper end of the plunger is made of pivotal form so as to support a rotary disk carrying arms to which the aforesaid chains are connected.

Practical experience with an apparatus of this type has shown that owing to unequal distribution of the pulling strains upon the chains, the plunger is liable to exert injurious side pressure upon the walls of its cylinder and packings.

Now the present invention has for its object to provide an improved apparatus of the aforesaid type which shall be free from the above stated drawbacks.

One embodiment of this invention is illustrated by way of example in the accompanying drawings in which:—

Figure 1 is a side elevation, and Fig. 2 is a part plan of the improved apparatus, Figs. 3 and 4 are views of details thereof.

As shown the head of the plunger 1 is constructed as a forked open-topped bearing adapted to carry the pivot pins 2 of a centrally fulcrumed lever 3 the ends of which are upwardly hooked so as to constitute open-topped bearings. This construction of the bearings is designed to facilitate the dismantling of the apparatus. In these bearings rest pins 4 that are mounted in the upper ends of connecting rods 5. The lower ends of these rods are connected respectively to pins 6 in the ends of a common crossbeam 7. This crossbeam is composed of two parallel pieces as shown in plan in Fig. 3.

8 is a double-sided hook mounted with its screw-threaded shank in a vertical hole in the middle of the crossbeam 7.

9 are the pulling chains engaged on the hook 8.

A force pump 17, which feeds the hydraulic cylinder is conveniently mounted on one of the legs of the framing.

A nut 10 on the shank of the hook 8 enables the pulling chains to be drawn taut before the force pump 17 is started in order to avoid consuming a portion of the stroke of the hydraulic plunger uselessly for tightening the chains.

The lower end of the plunger 1 (Fig. 4) is made of smaller diameter than the remainder of the plunger for the purpose of facilitating the placing of the packing leather 11 and packing ring 12 upon, and their removal from the said lower end. 13 is a plate fixed by a screw on the lower end of the plunger; its function is to hold the packing leather and packing ring in place.

For the purpose of relieving the strain on the legs of the framing, the said legs are encircled by a common rope 16 which is adapted to be drawn tight by means of a turnbuckle 14 or equivalent device. The rope 16 passes over guides 15 provided on the legs of the framing.

What I claim is:—

1. In apparatus for pulling tree stumps out of the ground, the combination with a portable framing, a vertical hydraulic cylinder mounted thereon, and a plunger working through the upper end of said hydraulic cylinder of a rocking beam fulcrumed centrally on the upper end of said plunger, two connecting rods pivoted in the ends of said rocking beam, a cross member connecting pivotally the lower ends of said connecting rods together and a hook carried by said cross member for engaging the pulling chains.

2. In apparatus for pulling tree stumps out of the ground, the combination with a portable framing a vertical hydraulic cylinder mounted thereon, and a plunger working through the upper end of said hydraulic cylinder, of a rocking beam fulcrumed centrally on the upper end of said plunger, formed with open-topped bearings in its ends, two connecting rods having their upper pins supported in said open-topped bearings and tension means pivotally connected to the lower ends of said connecting rods.

3. In apparatus for pulling tree stumps out of the ground, the combination with a portable framing, a vertical hydraulic cylinder mounted thereon, and a plunger working through the upper end of said hydraulic cylinder of a rocking beam fulcrumed centrally on the upper end of said plunger, two connecting rods pivoted in the ends of said rocking beam, a cross member connecting pivotally the lower ends of said connecting rods together, a hook having a screw threaded shank extending through a vertical hole in said cross member, and a nut on said shank for tightening the pulling chains before the force pump is started.

In testimony whereof I have signed my name to this specification in the presence of two subscribing witnesses.

KAROL von der MALSBURG.

Witnesses:
 JIRDOLIN SCHÖBEL,
 AUGUST FUGGER.

---

Copies of this patent may be obtained for five cents each, by addressing the "Commissioner of Patents, Washington, D. C."